US006685857B2

(12) United States Patent
Dowling et al.

(10) Patent No.: US 6,685,857 B2
(45) Date of Patent: Feb. 3, 2004

(54) METHOD OF REFURBISHING THERMOPLASTIC DRUMS

(75) Inventors: Virgil E. Dowling, Waynesville, GA (US); Ray P. Richard, Brunswick, GA (US); Samuel G. Dowling, Nahunta, GA (US); Johnny M. Seago, Hortense, GA (US)

(73) Assignee: Dowling & Son, Inc., Brunswick, GA (US)

( * ) Notice: Subject to any disclaimer, the term of this patent is extended or adjusted under 35 U.S.C. 154(b) by 415 days.

(21) Appl. No.: 09/903,833

(22) Filed: Jul. 11, 2001

(65) Prior Publication Data

US 2003/0011089 A1 Jan. 16, 2003

(51) Int. Cl.[7] .......................... B29C 73/00; B29C 73/24; B29C 73/30; B29C 73/34
(52) U.S. Cl. ................... 264/36.15; 264/154; 264/322; 264/334; 264/348; 425/11; 425/393; 425/403; 425/438; 425/444; 116/63 P; 404/10
(58) Field of Search .............................. 264/36.15, 154, 264/155, 322, 348, 334; 425/11, 392, 393, 403, 383, 444, 438; 116/63 P; 404/10

(56) References Cited

U.S. PATENT DOCUMENTS

| | | | | | |
|---|---|---|---|---|---|
| 2,322,350 A | * | 6/1943 | Dewees | ........................ | 8/137 |
| 3,389,193 A | | 6/1968 | Hughes | ........................ | 264/36 |
| 4,006,702 A | * | 2/1977 | St. Cyr | ........................ | 116/63 P |
| 4,093,683 A | * | 6/1978 | Harley | ........................ | 264/295 |
| 4,176,583 A | * | 12/1979 | Lage | ........................ | 86/24 |
| 4,276,010 A | * | 6/1981 | Shartzer | ........................ | 425/143 |
| 4,475,101 A | | 10/1984 | Kulp et al. | ............. | 340/114 R |
| 4,502,363 A | * | 3/1985 | Zimmerman | ................... | 86/24 |
| 4,522,770 A | | 6/1985 | Andersen | ..................... | 264/36 |
| 4,880,580 A | | 11/1989 | Bowers et al. | ................ | 264/26 |
| 5,409,644 A | * | 4/1995 | Martin et al. | ................ | 264/479 |
| 5,431,862 A | * | 7/1995 | Win | ........................... | 264/2.7 |
| 5,441,678 A | | 8/1995 | Liebbart | ...................... | 264/36 |
| 5,980,809 A | * | 11/1999 | Crain et al. | ................. | 264/318 |
| 6,042,361 A | * | 3/2000 | Murphy | ...................... | 425/546 |

FOREIGN PATENT DOCUMENTS

JP      55-135144 A   * 10/1980    ............. C08J/9/36

OTHER PUBLICATIONS

Derwent Abstract of JP–55–135144–A, Japanese Patent Office, Oct. 2003.*

* cited by examiner

Primary Examiner—Michael Colaianni
Assistant Examiner—Michael I. Poe
(74) Attorney, Agent, or Firm—Bradley Arant Rose & White LLP

(57) ABSTRACT

A method and apparatus for repairing or refurbishing thermoplastic drums, by which a damaged drum, or at least a damaged portion thereof, is heated until it reaches a softened state and is then drawn over a template, or mold, having the substantially the same shape and size of an undamaged drum. The drum is allowed to cool sufficiently to return to its hardened state, whereby it substantially assumes the shape of the template. The refurbished drum is then removed from the template and is essentially ready to be used again.

18 Claims, 4 Drawing Sheets

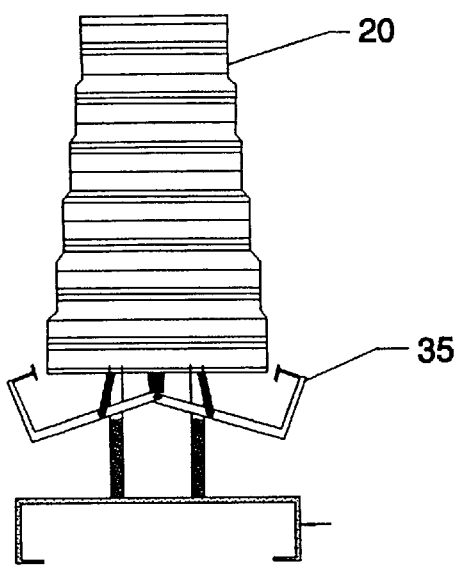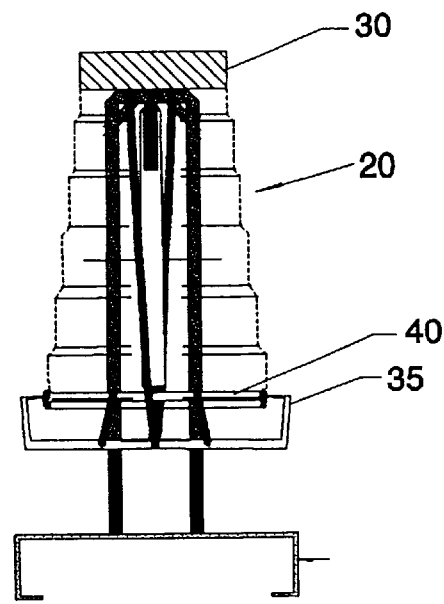
Fig. 4A          Fig. 4B
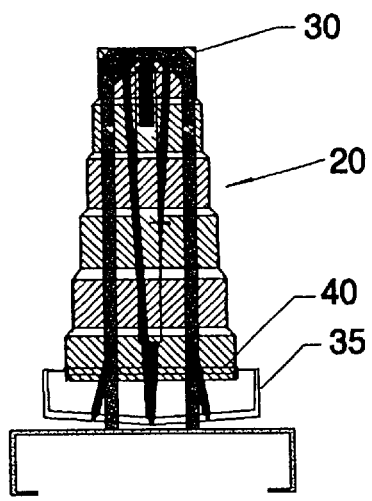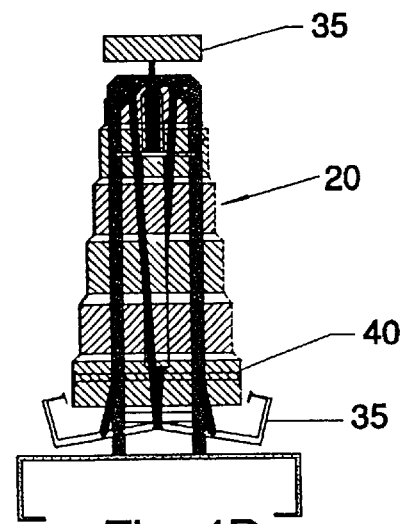
Fig. 4C          Fig. 4D
Fig. 4

METHOD OF REFURBISHING THERMOPLASTIC DRUMS

BACKGROUND

The present invention relates to the repair and refurbishment (which generally will be referred to herein as refurbishment) of thermoplastic drums, particularly of the sort commonly seen on road construction sites. These drums are frequently used to separate traffic on a road under repair from the construction zone, and as a result, the drums may be hit by passing cars or construction equipment. The drums usually are hollow, and when one is struck by a motor vehicle, the drum may dent, crumple, crease, or otherwise be deformed by the force of the impact, and often severely so. In addition, the drums often are unloaded from moving vehicles, being tossed into position by a construction worker, and some are damaged in this way.

With the seemingly ever increasing amount of road construction throughout the United States, such drums are in widespread use. When not in use, they usually are stored in a stacked configuration, one on top of the other. Prior to the present invention, there has been no reliable and repeatable way to refurbish the vast majority of damaged drums. In some cases, it is possible to "knock out" a smooth dent or depression, but generally, it is not possible to reuse damaged drums, and because they usually will not stack, their storage is problematic. One option is to recycle the thermoplastic material of which the drums are made. However, the drums typically have horizontal bands of reflective tape on their outer surface, which should be removed prior recycling. The removal of this reflective tape from a damaged drum can be difficult and costly to an extent that recycling the thermoplastic material is no longer cost efficient, especially in view of the relatively low cost of a new thermoplastic drum. As a result, drums which are damaged beyond use are often discarded. Consequently, there exists a need for an efficient, cost-effective way to refurbish damaged thermoplastic drums so that they can be used again, rather than discarded.

SUMMARY

The present invention satisfies this need by providing an efficient, cost-effective method and apparatus to refurbish thermoplastic drums. One embodiment of the invention includes a method for refurbishing a damaged thermoplastic drum comprising heating at least a damaged portion of the drum until the damaged portion becomes softened; drawing the drum over a template for said drum, where the exterior dimensions of the template substantially match the desired interior dimensions of the refurbished drum; allowing the softened portion of the drum, while on the template, to harden sufficiently to assume the shape of the template; and removing the drum from the template. The drum may be heated by immersing at least the damaged portion of the drum, and possibly the entire drum, in a liquid having a temperature equal to or greater than the softening point of the thermoplastic from which the drum is fabricated. The drum may be hardened by spraying it with cool water, or water having a temperature substantially less than the softening point of the thermoplastic. The template over which the drum is drawn may include an upper surface comprising an ejection cap and an ejector, such as a pneumatic cylinder and piston, positioned within the template and in engagement with the ejection cap, such that the ejector can be made to cause the ejection cap to separate from the body of the template in a direction substantially parallel to the longitudinal axis of the template, thus partially removing a refurbished drum from the template. Using the method and apparatus of the present invention, damaged thermoplastic drums may be refurbished quickly and easily.

BRIEF DESCRIPTION OF DRAWINGS

These and other features, aspects, structures, advantages, and functions are shown or inherent in, and will become better understood with regard to, the following description and accompanied drawings where:

FIGS. 4A–4D are a series of views of the embodiment shown in FIG. 1, illustrating its basic operation.

DETAILED DESCRIPTION OF PREFERRED EMBODIMENT

The present invention comprises an apparatus and method for refurbishing thermoplastic drums, specifically drums used as safety devices or markers at highway construction sites. Such drums are generally cylindrical in shape, with a slightly larger diameter at the bottom than the top. Rather than the cross-section of the drum being truly circular, however, it often is hexagonal, octagonal, or some other polygonal shape. The drums are hollow having a closed top and an open bottom and usually are designed to facilitate stacking one drum on top of the other for storage. The typical drum, and the type of drum for which the present invention is used, is made of a thermoplastic material, usually high density polyethylene. Because of the conditions in which these drums are used, they are frequently damaged and in need of refurbishment. The term damaged is used herein in a broad sense, to encompass any sort of dent, crease, bulge, or disfigurement of any kind in the drum.

By way of background, a brief overview of the properties of thermoplastics, which are well known in the art, may be useful. A thermoplastic may be defined as any of a group of polymers that can be easily, repeatedly processed and soften on heating. High density polyethylene (HDPE) is a common hard-to-soft, ductile, easily molded thermoplastic that is chemical resistant and has many industrial uses. Under conditions of normal use (i.e., typical outdoor ambient temperatures), HDPE is in a hardened state and has a fixed shape. As it is heated past a specific temperature (which will vary somewhat depending on the grade and thickness of the material), HDPE reaches a softened state in which it becomes quite pliable and ductile, and it may be molded, pressed, or drawn into a desired shape. The temperature at which the material softens will be referred to as the softening point. It has been empirically determined that the softening point of HDPE commonly used for safety drums varies from 190 F. to approximately 240 F., with the softening point most frequently being between 200 F. to 220 F. As the HDPE cools, it returns to its hardened state and once again maintains a fixed shape.

The present invention comprises a method and apparatus for repairing or refurbishing such thermoplastic drums, by which a damaged drum, or at least a damaged portion thereof, is heated until it reaches a softened state and is then drawn over a template, or mold, having the substantially the same shape and size of an undamaged barrel. The drum is allowed to cool sufficiently to return to its hardened state, whereby it substantially assumes the shape of the template. The refurbished drum is then removed from the template and is essentially ready to be used again. The apparatus and method for carrying out the invention is described in more detail below.

Figure 1:
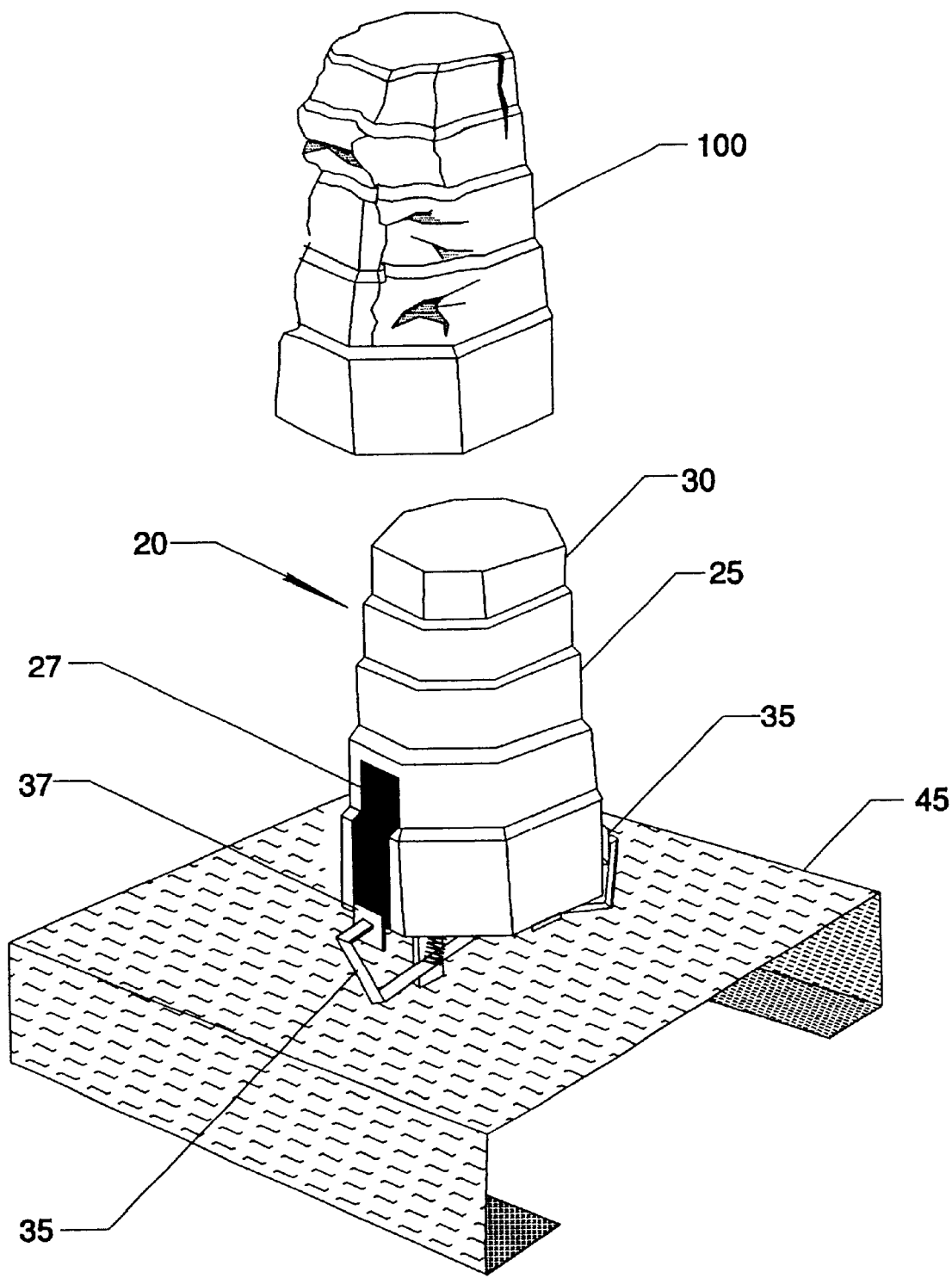
FIG. 1 is a front perspective view of an embodiment of the present invention.

As shown in FIG. 1, the drum refurbisher 10 comprises a template 20 having exterior dimensions that substantially match the desired interior dimensions of the refurbished drum, which usually is the shape of a new such drum, and it may be mounted on a base 45. The actual shape of the template will vary depending on the size and make of the drum to be repaired. An exemplary damaged drum 100 is shown. Such drums typically have a plurality of concentric sections, each section having a slightly smaller cross section than the one below it. Likewise, the template 20 comprises a body 25 having such sections. However, it should be understood the present invention may be adapted to work with a variety of shapes, and that shown in FIG. 1 is exemplary only. The template 20 is sized such that there will be a snug fit between the template and a drum drawn over it. The template 20 may be made of any suitably durable, heat resistant, and rigid material, including a variety of metals, ceramics, or composites, and it has been found that stainless steel performs well for the uses described herein. It has been observed that lower grade metals have a tendency to stick to a drum that has been drawn over the template. However, such a problem could be remedied by applying an appropriate lubricant or non-stick coating, such as Teflon®, to the surface of the template.

Figure 2:
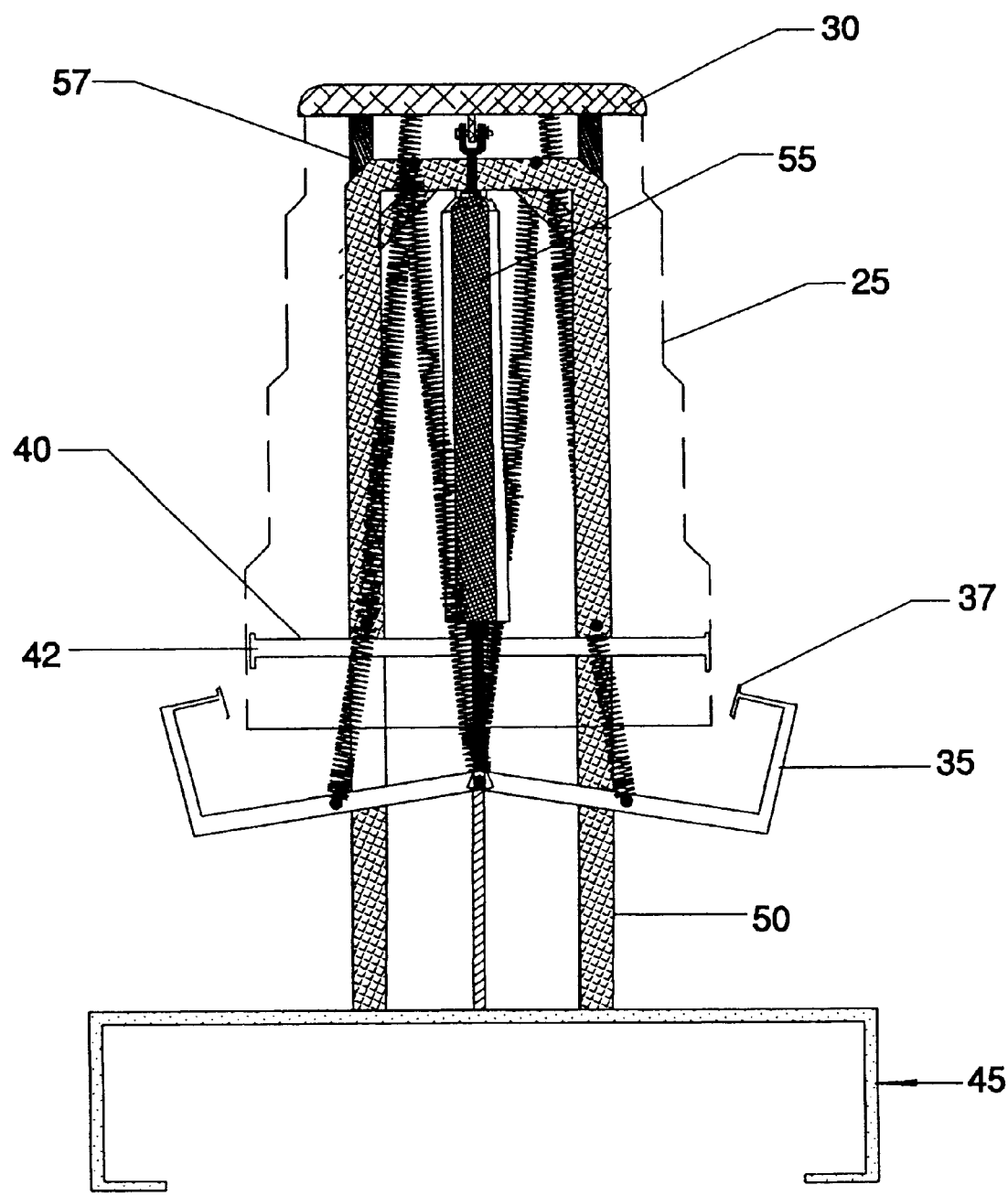
FIG. 2 is a front sectional view of the embodiment shown in FIG. 1.

In the embodiment shown, the template 20 includes an ejection cap 30. The ejection cap 30 is removable from the body 22 of the template 20. As shown in FIG. 2, the ejection cap 30 is attached to an ejector 55, which as explained below, is operational to reciprocally move ejection cap 30 in a direction substantially parallel to the longitudinal axis of the template 20 ("longitudinally"), whereby a drum which has been drawn over the template easily may be removed. It should be noted, however, such an ejection cap (and associated members) is not required to practice the invention, and a drum could be removed, albeit with less facility, manually or with other mechanical removal means.

The drum refurbisher 10 further comprises tension arms 35, each tension arm 35 terminating in shoe 37, and radial support member 40, which terminates on either end in shoes 42. The tension arms are operable to engage a drum partially drawn over the template between the shoes 37 of the tension arms 35 and the shoes 42 of the radial support member 40 by pressing the shoes 37 against the drum in a substantially radial direction (towards the interior of the template). The template 20 is provided with cutouts 27 which allow the shoes 42 of the radial support member 40 to contact the inside of the drum under repair. With the drum held between both sets of shoes, the tension arms 37 and radial support member 40 move longitudinally downward towards the base 45 whereby the drum is fully drawn over the template 20. As with the ejection cap 30, the tension arms (and associated members) are not required to practice the invention, but rather provide a mechanical means to facilitate fully drawing a drum over the template 20. The particular design of tension arms 35 and support member 40 shown in FIGS. 1–4 is exemplary only, and a variety of mechanical means would suffice. For example, a set of robot arms could be mounted on a structure external to the template, which would allow the robot arms to apply an inward radial force to engage the drum and exert a downward, longitudinal force to pull the drum fully into position over the template. One skilled in the art could design a variety mechanical configurations, either power-assisted or manually driven, which would provide this functionality.

Referring to FIG. 2, a front sectional view of the drum refurbisher 10 is shown. The template 20 includes a frame 50 and ejector 55. The frame 50 comprises several fixed rigid members to provide support to the body 22 of the template 20. Depending on the material and construction of template 20, such a frame may not be necessary. For example, the template 20 could be constructed of heavy gauge stainless steel that has sufficient rigidity and strength to obviate the need for an internal frame, or the template 20 could be constructed from a solid or nearly solid piece of pieces of steel, having a central bore to accommodate ejector 55. Template 20 simply needs to have sufficient rigidity and strength to maintain a substantially fixed shape during the refurbishing process.

Ejector 55 may be any device operable to cause ejection cap 30 to separate from the body 22 of template 20, thereby facilitating the removal of a drum drawn over template 20. In one embodiment, ejector 55 comprises a pneumatic cylinder having a reciprocating piston operably engaged with ejection cap 30, whereby the application of air pressure to the cylinder ejects the piston from the cylinder in an upward longitudinal direction, away from the base 45, causing the ejection cap 30 to separate from the body 22 of the template 30. A set of springs 57 is used to return the ejection cap to its retracted position. Alternative means for the ejecting the ejection cap may be used. For example, the ejector 55 could employ a hydraulic cylinder and piston operating in a similar fashion, an electrically driven motor and arm, or a manually driven arm and lever. Other means of controllably effecting a substantially linear conveyance are known in the mechanical arts, and any such means that is capable of causing ejection cap 30 to separate from the body 22 and thereby facilitate removal of a refurbished drum would be suitable here.

Figure 3:
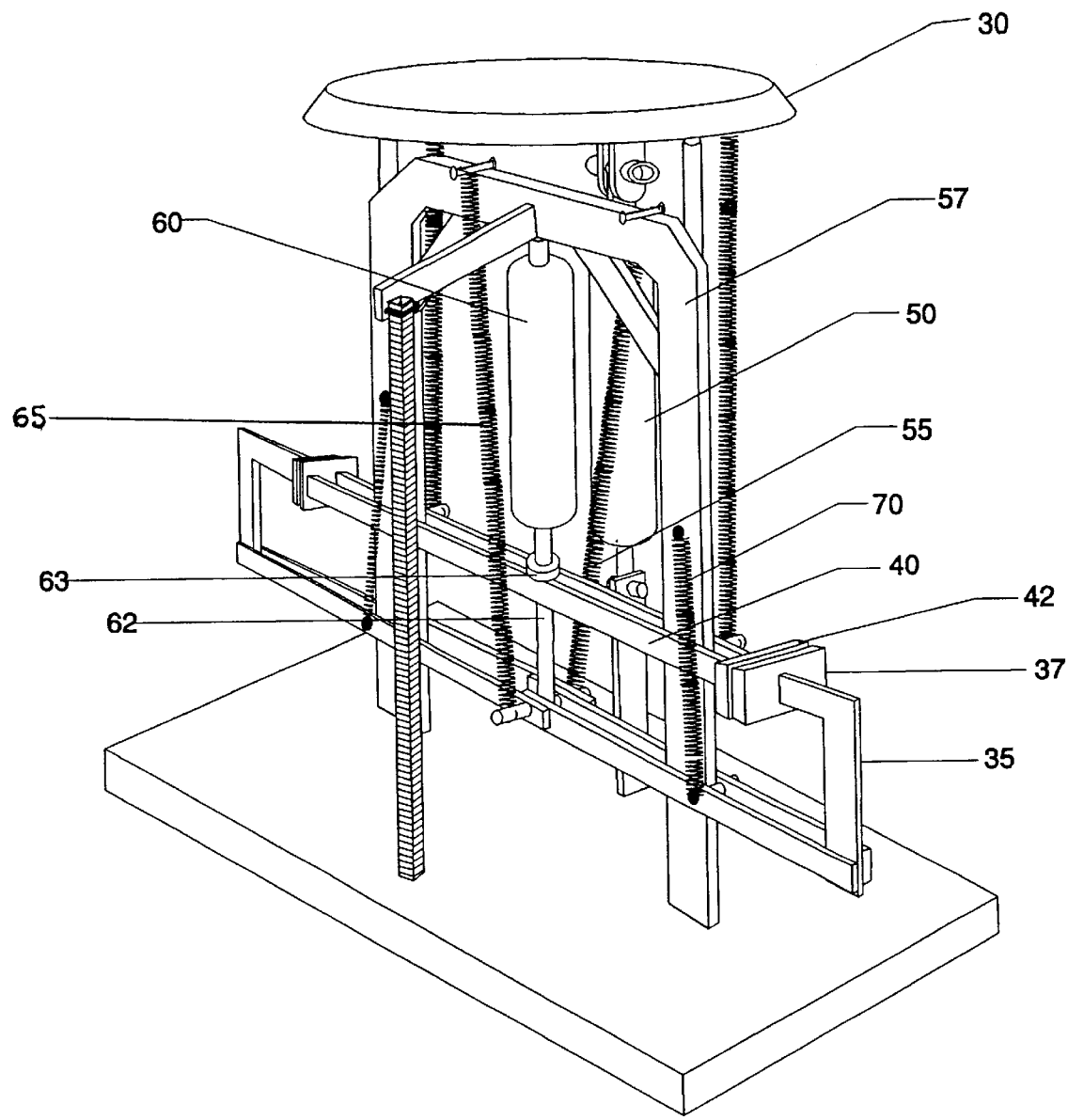
FIG. 3 is a rear perspective view of the embodiment shown in FIG. 1.

As described above, and as shown more fully in FIG. 3 and FIGS. 4A–4D, the tension arms 35 work in conjunction with radial support member 40 to engage a drum partially drawn over the template 20 and pull the drum fully over the position. An actuator 60, such as a pneumatic cylinder and piston, is used to drive this operation. The template 20 is provided with cutouts 27 to the shoes 42 of the radial support member 40 to contact the drum. FIGS. 2 and 4A show the position of the tension arms and support member prior to engaging a drum. The tension arms 35 are hinged at their center and are operably connected to the piston 62 of actuator 60. When the actuator is not pressurized, a set of inner arm springs 65 pulls the center of the tension arms upward, causing the shoes 37 to be in an out and downward position with respect to the template. The tension arms are further provided with a set of outer arm springs 70, which tend to pull the arms upward as the hinged center is driven downward by the actuator, thus bringing the shoes 37 into contact with and exerting a radial pressure on a drum partially drawn over the template, as shown in FIG. 3. The radial support member 37 has a slot, through which the actuator's piston passes. The piston in turn has an enlarged ring 63 which will not pass though the slot and thus which drives the radial support member downward when the ring presses against the member. The tension arms 35, the radial support member 40, and the piston 62 and its ring 63 cooperate to synchronize the engagement of the ring against the support member at the same time the shoes 37 of the tension arms and the shoes 42 of the support member 40 press against one another through the cutouts 27 (holding the drum) by action of the actuator. The parts then move longitudinally downward drawing the drum fully over the template. This operation is shown in FIGS. 4A–4D. As noted above, this particular mechanical configuration is one of many designs possible to engage a drum and pull it fully into position.

The method of refurbishing a damaged thermoplastic drum using the drum refurbisher 10 will now be described. A typical damaged thermoplastic drum 100 may have regular or irregular dents, creases and bulges over its surface, and which interfere with its use in some way, and sometimes may be severely disfigured from a collision with an automobile, for example. The damaged portion of the drum is heated until it reaches a softened state. Often there are numerous damaged places on the drum, so it may be desirable to heat the entire drum at one time so that all damaged portions may be repaired simultaneously as described herein.

Any means of uniformly heating the drum (or at least its damaged portions) is suitable. It has been found that immersing the drum in a liquid heated above the softening point of the thermoplastic material of the drum is an economical and expedient method of heating, and it will be described in more detail below. However, it also would be possible to soften the drum by exposing it to a heated air flow or radiant heat source which would uniformly heat the thermoplastic material to a softened state.

Utilizing the immersion method of heating, the drum is immersed in a fluid having a temperature equal to or greater than the softening point of the thermoplastic. For HDPE drums, this temperature has been empirically determined to range from about 190 F. to 240 F., the variation apparently due to the material and construction of the drum. Therefore, for some drums, water will suffice as the heated fluid. However, for the majority of HDPE drums, the softening point is above the boiling point of water, so a solute is necessary to elevate the boiling point of the fluid to the desired level. The particular solute used is not critical, so long as it is nonvolatile, does not react with the thermoplastic, and has the effect of elevating the fluid's boiling point to or above the softening point of the thermoplastic. One such solute is ethylene glycol, a substance commonly found in automotive antifreeze. Ethylene glycol has the added benefit of having a lubricating property, which facilitates the drawing over and removal of the drum from the template, as described below. Another suitable solute is propylene glycol. The necessary concentration of ethylene glycol or propylene to water to elevate the boiling point of the solution to a given level is well known in the art.

The fluid is contained in a tank or vat (not illustrated) large enough to accommodate the drum and a sufficient volume of fluid to heat the drum, and the fluid is heated by any conventional heat source. The drum is immersed in the heated fluid until it reaches a softened state, which typically takes about 7–15 seconds. Prior to immersing the drum in the fluid, a hole, of about one inch in diameter, may be drilled through the top of drum. Such a hole allows air to escape through the drum as it is immersed in the fluid bath. However, because the drums are hollow, the drum could be immersed on its side such that the hole is not required.

The drum is removed from the vat and while still in a softened state, it is drawn over the template 20, as shown in FIGS. 4A–4D. Most drums are larger at the bottom than at the top, so that they can be easily dropped over the template until the bottom of the barrel meets the lowermost section of the template body 25. At this point, there is a snug fit between the heated drum and the template, such that the drum must stretch very slightly as it is drawn into its final position. As the drum is fully drawn over the template 20, the damaged surfaces are repaired as the various creases, dents, and imperfections are smoothed or pressed out by the force of the template against the interior of the drum. Because of the friction between the drum and the template, it is desirable to have a mechanical means to assist with drawing the drum into its final position. As described above, the tension arms in cooperation with the radial support member perform this function by exerting a radial force on the drum to engage it, and then pulling the drum in a longitudinal direction downward into its final position. A pathway which allows the air between the interior of the drum and the template 20 to escape facilitates drawing the drum into its final position. Such a pathway is formed when a hole has been drilled through the top of the barrel. Alternatively, the interior of the template may be hollow, or at least have a channel extending from the top to bottom and open to the outside, and the ejection cap can be provided with a hole to create a pathway for the air to escape through the interior of the template.

The drum is either allowed to cool or actively cooled to such a point that the thermoplastic material reaches a sufficiently hardened state to assume the shape of the template. A spray of cool water is sufficient to cool the drum as described, and also serves to rinse the remnants of the heated fluid from the surface of the drum.

Finally, the drum is removed from the template. Again, due to the snug fit between the drum and the template, mechanical assistance facilitates removal. As described above, the ejector causes the ejection cap to separate longitudinally from the template, thereby exerting an upward force on the interior top of the drum, moving it upward and releasing the snug fit with the template, such that it can easily be removed from the template. The drum also could be removed manually, or by external mechanical means (e.g., a robot arm).

Although the present invention has been described and shown in considerable detail with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

We claim:

1. A method for refurbishing a damaged thermoplastic drum, said method comprising:
    heating at least one damaged portion of the drum until said portion becomes softened;
    drawing said drum over a template for said drum whereby said at least one damaged, softened portion is forced to conform to the exterior of said template;
    allowing the at least one damaged, softened portion of said drum while on said template to harden sufficiently to assume the shape of said template; and
    removing said drum from said template.

2. The method of claim 1, wherein the heating step comprises substantially immersing said drum in a liquid heated to a temperature sufficient to cause said drum to reach a softened state.

3. The method of claim 1 wherein said allowing step comprises cooling said drum while on said template.

4. The method of claim 3 wherein said cooling comprises disposing on the surface of said drum water having a temperature substantially less than the temperature at which said portions of said drum become softened.

5. The method of claim 1 further comprising, before the drawing step, making at least one hole in the top of said drum.

6. The method of claim 5 wherein said hole is approximately 1 inch in diameter.

7. The method of claim 1, wherein the heating step comprises immersing the at least one damaged portion of said drum in a liquid heated to a temperature sufficient to cause said portion to reach a softened state.

8. The method of claim 7, wherein said at least one damaged portion is immersed in said liquid for about 7 to 15 seconds.

9. The method of claim 7, wherein said liquid comprises water.

10. The method of claim 9, wherein said temperature is 190–212 F.

11. The method of claim 7, wherein said liquid comprises a solution of water and a solute, the concentration of said solute sufficient to elevate the boiling point of said solution beyond the temperature necessary to cause said thermoplastic drum to reach a softened state.

12. The method of claim 11 wherein said solute is ethylene glycol.

13. The method of claim 12 wherein said temperature is 190–240 F.

14. The method of claim 13 wherein said temperature is 200–220 F.

15. A method of refurbishing a damaged thermoplastic drum, said method comprising:

immersing said drum in a liquid having a temperature greater than the softening point of said drum until at least the damaged portions of said drum reach a softened state;

drawing said drum over a template for said drum, whereby the damaged portions of said drum are forced to conform to the exterior of said template;

cooling said drum while on said template until said damaged portions of said drum reach a sufficiently hardened state to assume the shape of said template; and removing said drum from said template.

16. The method of claim 15, wherein said cooling step comprises disposing on the surface of said drum water having a temperature substantially less than the temperature at which said drum become softened.

17. The method of claim 15, wherein said liquid comprises a solution of water and ethylene glycol.

18. The method of claim 17, wherein said solution has a boiling point greater than 220 F.

* * * * *